United States Patent
Tu et al.

(10) Patent No.: US 9,142,991 B2
(45) Date of Patent: Sep. 22, 2015

(54) CURRENT REGULATION SYSTEM

(71) Applicant: FEELING TECHNOLOGY CORP., Hsinchu (TW)

(72) Inventors: Yu-Jen Tu, Hsinchu (TW); Wei-Chung Liu, Hsinchu (TW)

(73) Assignee: Feeling Technology Corp., Hsinchu (TW)

(*) Notice: Subject to any disclaimer, the term of this patent is extended or adjusted under 35 U.S.C. 154(b) by 310 days.

(21) Appl. No.: 13/771,362

(22) Filed: Feb. 20, 2013

(65) Prior Publication Data
US 2014/0167681 A1 Jun. 19, 2014

(30) Foreign Application Priority Data
Dec. 14, 2012 (TW) .............................. 101147415 A (51) Int. Cl.
*H02J 7/00* (2006.01)
*H02J 7/04* (2006.01)
(52) U.S. Cl.
CPC *H02J 7/007* (2013.01); *H02J 7/045* (2013.01)
(58) Field of Classification Search
CPC ........... H02J 7/00; H02J 7/007; H02J 7/0045; G05F 1/56; Y02E 70/40
USPC .................. 320/107, 150, 234; 327/427, 108; 361/86, 92
See application file for complete search history.

(56) References Cited

U.S. PATENT DOCUMENTS

| | | | |
|---|---|---|---|
| 7,161,393 B1* | 1/2007 | Potanin et al. | 327/108 |
| 2005/0017270 A1* | 1/2005 | King | 257/202 |
| 2008/0278111 A1* | 11/2008 | Genies et al. | 320/101 |
| 2014/0084848 A1* | 3/2014 | Liu et al. | 320/107 |

FOREIGN PATENT DOCUMENTS

TW 221692 I 10/2004

* cited by examiner

*Primary Examiner* — Mohammed Alam
(74) *Attorney, Agent, or Firm* — Rosenberg, Klein & Lee (57) ABSTRACT

A current regulation system for generating a charging current curve for charging a rechargeable battery is provided, the system including a current regulation module coupled to a power converter to output a conversion current in a constant current mode and a constant voltage mode, a voltage-to-current regulation module coupled to the rechargeable battery to output a voltage conversion current in the constant voltage mode, a temperature-to-current regulation module and a resistance. The temperature-to-current regulation module outputs a temperature conversion current in the constant current mode and the constant voltage mode. The resistance is coupled to the current regulation module, the voltage-to-current regulation module and the temperature-to-current regulation module to regulate the voltage conversion current or the temperature conversion current, the conversion current is weakened by maintain a constant value so the charging current curve is regulated when the power of the rechargeable battery is full.

19 Claims, 5 Drawing Sheets

CURRENT REGULATION SYSTEM

This application claims the benefits of the Taiwan Patent Application Serial No. 101147415 filed on Dec. 14, 2012, the subject matter of which is incorporated herein by reference.

BACKGROUND OF THE INVENTION

1. Field of the Invention

The present invention relates to the current regulation system and more particularly, relates to a current regulation system regulating a charging current curve of a rechargeable battery by maintaining a constant value of a voltage of a resistance.

2. Description

The rapid development of electronic devices due to science and technology has improved the standard of human life greatly. As numerous electronic devices are produced nowadays, rechargeable batteries, which are very convenient and can be used repeatedly, are used in electronic devices such as laptops, PDAs, mobile phones, etc. Charging devices are utilized to recharge rechargeable batteries directly or to charge electronic devices including rechargeable batteries.

Figure 1:
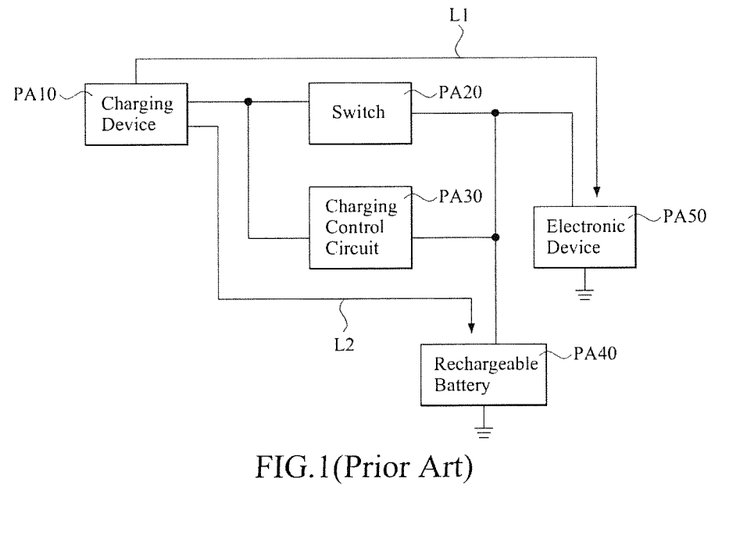
FIG. 1 is a schematic view of a conventional charging device charging a rechargeable battery and an electronic device.

Please refer to FIG. 1, a schematic view of a conventional charging device charging a rechargeable battery and an electronic device. A charging device PA10 is coupled to a switch PA20 and a charging control circuit PA30; a rechargeable battery PA40 is coupled to the switch PA20, the charging control circuit PA30 and an electronic device PA50. When the charging device PA10 charges the electronic device PA50 via a charging route L1, it is deemed that the charging route L1 includes the switch PA20. The conversion efficiency of charging device PA10 directly charging the electronic device PA50 still needs to be improved; for example, the charging efficiency for a backup battery charger to charge a smart phone is bad. Thus, solutions for this problem are offered. A linear regulator is described in Taiwan Patent No. 1221692, "Charging System Having Current Regulation and Temperature Regulation" to improve the performance of the switch PA20.

Besides, when the charging device PA10 charges the rechargeable battery PA40 via a charging route L2, the charging control circuit is utilized to control the charging status of the rechargeable battery PA40 to have better charging performance. Relative technical features to improve the charging control circuit PA30 have been provided; for example, U.S. Pat. No. 7,161,393 has described that the charging performance is enhanced by regulating output currents by judging the voltages. However, there are still problems such as a constant voltage charging mode and a constant current charging mode cannot smoothly comply with temperature regulation and thus the circuit is unstable.

SUMMARY OF THE INVENTION

In prior art, the problem of unstable loop still exists. Therefore, a current regulation system is provided according to embodiments of the present invention. The system regulates a voltage conversion current and a temperature conversion current and regulates a charging current curve of a rechargeable battery by maintaining a constant value of a voltage of a resistance in order to avoid an unstable loop.

A current regulation system is provided, the system generating a charging current curve for charging a rechargeable battery, the system coupled to a power converter and the rechargeable battery, receiving an input voltage of the power converter and outputting an output voltage to the rechargeable battery, the system including a current regulation module, a voltage-to-current regulation module, a temperature-to-current regulation module and a resistance. The current regulation module is coupled to the power converter, outputting a conversion current in a constant current mode and a constant voltage mode; the voltage-to-current regulation module is coupled to the rechargeable battery, generating a voltage conversion current according to the output voltage and a first reference voltage in the constant voltage mode.

The temperature-to-current regulation module generates and outputs a temperature conversion current according to a temperature of the rechargeable battery in the constant current mode and the constant voltage mode; a resistance is coupled to the current regulation module, the voltage-to-current regulation module and the temperature-to-current regulation module, the resistance receiving the conversion current, the voltage conversion current and the temperature conversion current, wherein the resistance includes a resistance voltage and the resistance voltage includes a constant value; when the resistance regulates the voltage conversion current or the temperature conversion current in the constant current mode and the constant voltage mode, the constant value is maintained so the conversion current is gradually weakened; the charging current curve is regulated when the power of the rechargeable battery is full.

The current regulation module includes a differential amplifier and a transistor, the differential amplifier outputting a control voltage according to the input voltage and the output voltage, the transistor controlling the conversion current generated by the power converter and flowing through the transistor. Moreover, the current regulation system is further coupled to a compensation circuit and includes an error amplifier coupled to the current regulation module, the voltage-to-current regulation module, the temperature-to-current regulation module, the resistance and the compensation circuit, the error amplifier including a second reference voltage, the error amplifier outputting an error voltage to the compensation circuit for compensation according to the second reference voltage and the resistance voltage.

When the rechargeable battery is charging in the constant current mode, all the conversion current flows through the resistance; when the output voltage reaches a first threshold value, the rechargeable battery is charging in the constant voltage mode so the voltage conversion current flows through the resistance and is gradually amplified and the conversion current is gradually weakened; when the amount of the conversion current flowing through the resistance reaches a second threshold value, the power of the rechargeable battery is full and the charging current curve is regulated. Besides, the voltage-to-current regulation module is selected from the group of linear amplifier, voltage to current circuit and operational transconductance amplifier; the temperature-to-current regulation module is selected from the group of proportional to absolute temperature circuit and complimentary to absolute temperature circuit; the temperature-to-current regulation module generates and outputs the temperature conversion current.

According to another embodiment of the present invention, when the rechargeable battery is charging in the constant current mode, all the conversion current flows through the resistance; when the output voltage reaches a first threshold value, the rechargeable battery is charging in the constant voltage mode so the voltage conversion current flows through the resistance and is gradually amplified, and the temperature-to-current module gradually amplifies the temperature conversion current according to the temperature so that the conversion current is gradually weakened; when the amount of the conversion current flowing through the resistance reaches a second threshold value, the power of the rechargeable battery is full and the charging current curve is regulated.

Compared with prior art, the current regulation system provided according to embodiments of the present invention regulates a voltage conversion current and a temperature conversion current and regulates a charging current curve of a rechargeable battery by maintaining a constant value of a voltage of a resistance; thus, regulations are performed smoothly in a constant current mode, a constant voltage mode and a temperature regulation mode without mutually interfering or suppressing which often leads to an unstable loop, and so as to improve charging efficiency.

BRIEF DESCRIPTION OF THE DRAWINGS

Other features and advantages of this invention will become more apparent in the following detailed description of the preferred embodiments of this invention, with reference to the accompanying drawings.

DETAILED DESCRIPTION OF THE PREFERRED EMBODIMENT

The present invention relates to a current regulation system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
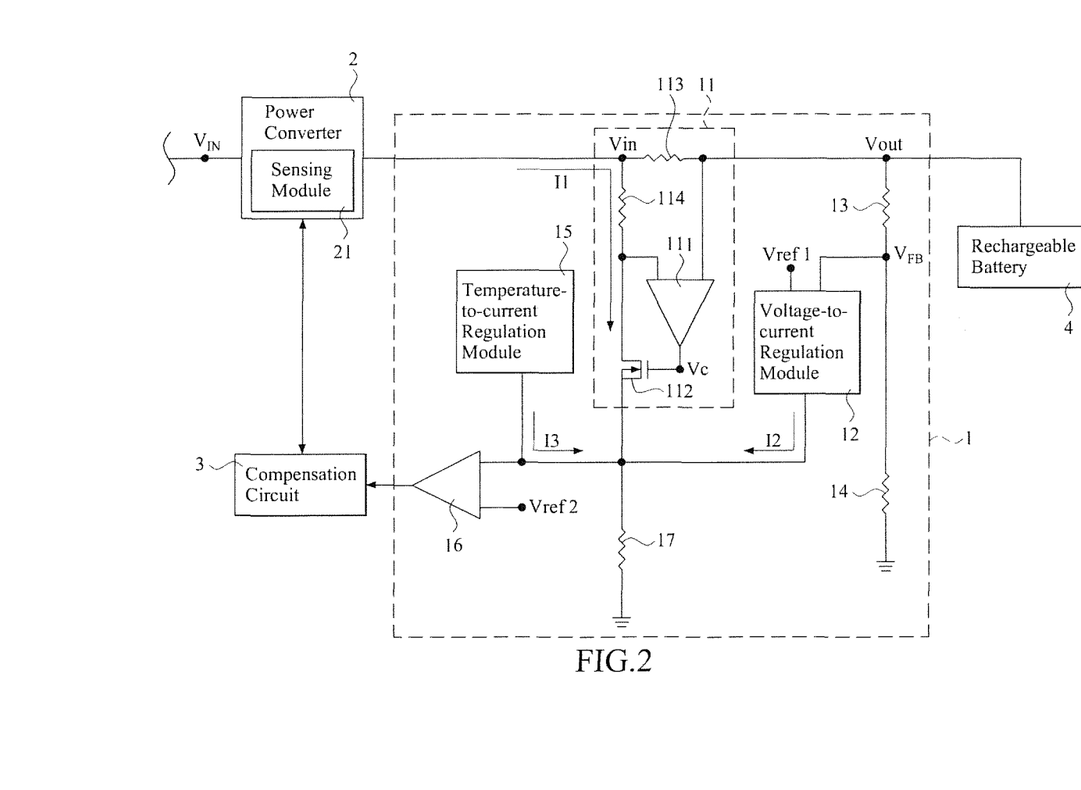
FIG. 2 is a schematic view of a circuit of a current regulation system according to an embodiment of the present invention.
Figure 3:
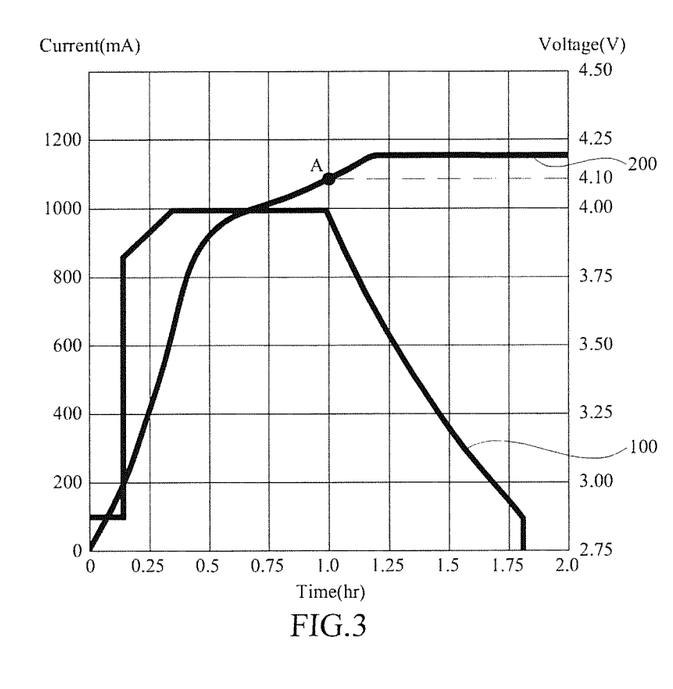
FIG. 3 is a curve graph showing the current and the voltage of a rechargeable battery according to an embodiment of the present invention.
Figure 4:
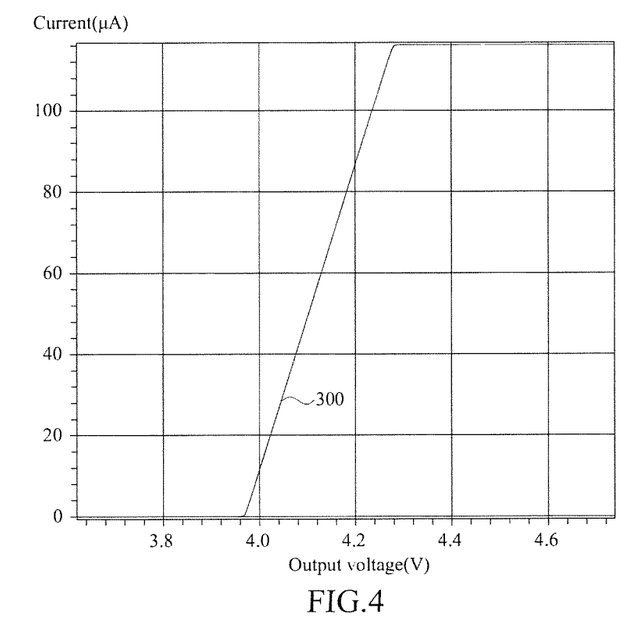
FIG. 4 is a graph showing a curve of a voltage-to-current regulation module according to an embodiment of the present invention.
Figure 5:
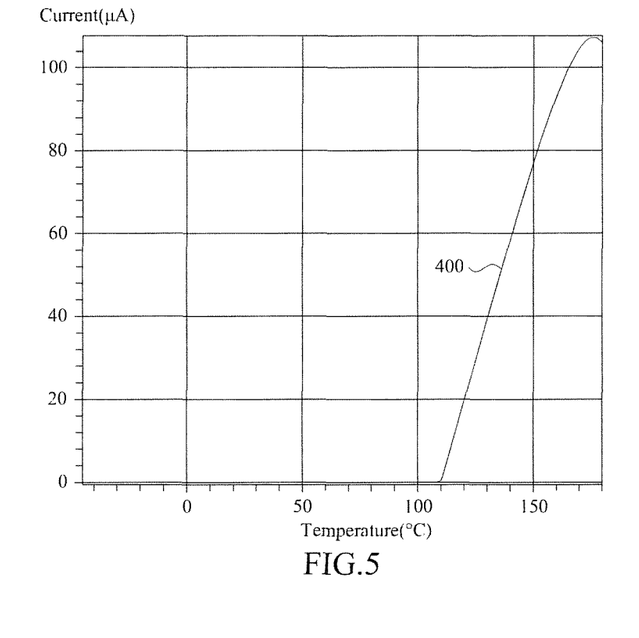
FIG. 5 is a graph showing a curve of a temperature-to-current regulation module according to an embodiment of the present invention.

Please refer to FIG. 2 to FIG. 5; FIG. 2 is a schematic view of a circuit of a current regulation system according to an embodiment of the present invention; FIG. 3 is a curve graph showing the current and the voltage of a rechargeable battery according to an embodiment of the present invention; FIG. 4 is a graph showing a curve of a voltage-to-current regulation module according to an embodiment of the present invention; and FIG. 5 is a graph showing a curve of a temperature-to-current regulation module according to an embodiment of the present invention. A current regulation system 1 is coupled to a power converter 2, a compensation circuit 3 and a rechargeable battery 4, receives an input voltage Vin of the power converter 2, outputs an output voltage Vout to the rechargeable battery 4 (the output voltage Vout is also the battery voltage of the rechargeable battery 4), and regulates a charging current curve 100 charging the rechargeable battery 4. The input voltage Vin receives a power input voltage VIN and outputs to the current regulation system 1 via a circuit (the circuit belongs to prior art and is not mentioned redundantly here). The rechargeable battery 4 includes any rechargeable battery in the market; according to an embodiment of the present invention, the rechargeable battery 4 includes a Li battery.

The current regulation system 1 includes a current regulation module 11, a voltage-to-current regulation module 12, a resistance 13, a resistance 14, a temperature-to-current regulation module 15, an error amplifier 16 and a resistance 17. The current regulation module 11 is coupled to the power converter 2 and includes a differential amplifier 111, a transistor 112, a resistance 113 and a resistance 114. The differential amplifier 111 is coupled to the transistor 112 (in a control end), the resistance 113 and the resistance 114; the resistance 113 is coupled to the resistance 114 and forms a mode similar to a differential input; that is, according to an embodiment of the present invention, the input voltage Vin is located where the resistance 113 is coupled to the resistance 114 and by voltage division, the input voltage Vin performs as an input voltage (not shown) of the differential amplifier 111 and the output voltage Vout performs as another input voltage (not shown) of the differential amplifier 111.

The voltage-to-current regulation module 12 is coupled to the resistance 13, the resistance 14 and the rechargeable battery 4; the resistance 13 is coupled to the resistance 113 of the current regulation module 11. According to an embodiment of the present invention, the voltage-to-current module 12 receives an adjustable first reference voltage Vref1 and receives a divided voltage $V_{FB}$ of the output voltage Vout in the resistance 13 and the resistance 14. The voltage-to-current regulation module is selected from the group of linear amplifier, voltage to current circuit and operational transconductance amplifier. Any circuit that converts voltages to currents is included in the spirit of the present invention.

The temperature-to-current regulation module 15 is coupled to the transistor 112 of the current regulation module 11 and the voltage-to-current regulation module 12; the temperature-to-current regulation module 15 is selected from the group of proportional to absolute temperature circuit and complimentary to absolute temperature circuit; that is, the temperature-to-current regulation module 15 is selected from the group of positive temperature coefficient circuit and negative temperature coefficient circuit.

The error amplifier 16 is coupled to the temperature-to current regulation module 15, the transistor 112 of the current regulation module 11, the voltage-to-current regulation module 12 and the compensation circuit 13. The resistance 17 is coupled to the transistor 112 of the current regulation module 11, the voltage-to-current regulation module 12, the temperature-to-current regulation module 15 and the error amplifier 16. The resistance 17 includes a resistance voltage that is a constant value; the error amplifier 16 receives an adjustable second reference voltage Vref2 and the resistance voltage of the resistance 17. Additionally, the resistance 17 includes a current-to-voltage converter according to an embodiment of the present invention. The resistance 17 includes other circuits according to other embodiments of the present invention. The power converter 2 includes a sensing module 21 and the compensation circuit 3 is electrically connected to the power converter. The compensation circuit 3 belongs to prior art and is not mentioned redundantly here.

The current regulation module 11 outputs a conversion current I1 when charging in a constant current mode and a constant voltage mode. The differential amplifier 111 outputs a control voltage Vc according to the input voltage Vin and the output voltage Vout (more specifically, according to the divided voltage of the input voltage and according to the output voltage). The transistor 112 controls the conversion current I1 generated by the power converter 2 and flowing through the transistor 112, wherein the transistor 112 controls the volume of the conversion current I1 flowing through the transistor 112 according to the control voltage Vc. The voltage-to-current regulation module 12 generates and outputs a voltage conversion current I2 according to the output voltage Vout and the first reference voltage Vref1 in the constant voltage mode.

The temperature-to-current regulation module 15 generates and outputs a temperature conversion current I3; the error amplifier 16 outputs an error voltage (not shown) to the compensation circuit 3 for compensation according to the second reference voltage Vref2 and the resistance voltage. The technique of compensation belongs to prior art and is not within the scope of the present invention, and thus, it is not mentioned here. Additionally, the resistance voltage of the resistance 17 is a constant value in a locked loop for regulating the voltage conversion current I2 or the temperature conversion current I3 in the constant current mode and the constant voltage mode, and the constant value is maintained so the conversion current I1 is gradually weakened so the charging current curve 100 is regulated when the power of the rechargeable battery 4 is full, wherein the sensing module 21 of the power converter 2 senses the power of the rechargeable battery 4 and determines whether the power is full (for example, sense that the volume of the conversion current I1 is ⅕ or 1/10 lesser then its original volume); when the power is full, the constant voltage mode is switched off.

Specifically, take the regulation of voltage conversion current I2 as an example by referring to FIG. 3. When the rechargeable battery 4 is charging in the constant current mode, all the conversion current I1 flows through the resistance 17; when the output voltage Vout reaches a first threshold value (e.g. A threshold voltage A of a current and voltage curve 200 in FIG. 3 is about 4.10V, before 4.10V being the constant current mode and after 4.10V being the constant voltage mode. The value of threshold is not limited hereof), the rechargeable battery 4 is charging in the constant voltage mode. By the regulation of the voltage-to-current regulation module 12, the voltage conversion current I2 flowing through the resistance 17 is gradually amplified (Refer to a voltage-to-current curve 300 shown in FIG. 4; FIG. 4 shows an embodiment of the present invention and does not comply with FIG. 3; FIG. 4 does not limit the voltage-to-current curve 300 and can be adjusted correspondingly; the X axis is the output voltage Vout but can be the divided voltage $V_{FB}$ according to other embodiments of the present invention.) and since the resistance voltage of the resistance 17 must be maintained as the constant value, the conversion current I1 is gradually weakened; when the amount of the conversion current I1 flowing through the resistance 17 reaches a second threshold value (for example, the volume of the conversion current I1 is 0 or ⅕ or 1/10 lesser then its original volume), the power of the rechargeable battery 4 is full and the charging current curve 100 is regulated.

Additionally, take the regulation of the temperature conversion current I3 as an example by referring to FIG. 3 and FIG. 5 together. When the rechargeable battery 4 is charging in the constant current mode, all the conversion current I1 flows through the resistance 17; and the temperature-to-current regulation module 12 makes the temperature conversion current I3 flow through the resistance 17 and gradually amplifies it (Refer to a temperature-to-current curve 400 in FIG. 5; FIG. 5 shows an embodiment of the present invention and does not limit the temperature-to-current curve 400 and can be adjusted correspondingly); since the resistance voltage of the resistance 17 must be maintained as the constant value, the conversion current I1 is gradually weakened as the temperature conversion current I3 is amplified.

Additionally, take the regulation of voltage conversion current I2 and the temperature conversion current I3 as an example by referring to FIG. 3 and FIG. 4 and FIG. 5 together. When the rechargeable battery 4 is charging in the constant current mode, all the conversion current I1 flows through the resistance 17; when the output voltage Vout reaches a first threshold value (e.g. A threshold voltage A of a current and voltage curve 200 in FIG. 3 is about 4.10V, before 4.10V being the constant current mode and after 4.10V being the constant voltage mode. The value of threshold is not limited hereof), the rechargeable battery 4 is charging in the constant voltage mode. By the regulation of the voltage-to-current regulation module 12, the voltage conversion current I2 flowing through the resistance 17 is gradually amplified (refer to a voltage-to-current curve 300 shown in FIG. 4) and the temperature-to-current regulation module 12 makes the temperature conversion current I3 flow through the resistance 17 and gradually amplifies it (Refer to a temperature-to-current curve 400 in FIG. 5; FIG. 5 shows an embodiment of the present invention and does not limit the temperature-to-current curve 400 and can be adjusted correspondingly); since the resistance voltage of the resistance 17 must be maintained as the constant value, the conversion current I1 is gradually weakened as the voltage conversion current I2 and the temperature conversion current I3 amplify; when the amount of the conversion current I1 flowing through the resistance 17 reaches a second threshold value (for example, the volume of the conversion current I1 is 0 or ⅕ or 1/10 lesser then its original volume), the power of the rechargeable battery 4 is full and the charging current curve 100 is regulated. (A three-dimensional curve graph including current, voltage and temperature can be established. Temperature is not illustrated according to the charging current curve 100 in FIG. 3.)

In conclusion, the current regulation system 1 provided according to embodiments of the present invention regulates the voltage conversion current I2 and the temperature conversion current I3 and regulates the charging current curve 100 of the rechargeable battery 400 by maintaining the constant value of the resistance voltage of the resistance 17; thus, regulations are performed smoothly in the constant current mode, the constant voltage mode and the temperature regulation mode without mutually interfering or suppressing which often leads to an unstable loop, and so as to improve charging efficiency.

While the present invention has been particularly shown and described with reference to a preferred embodiment, it will be understood by those skilled in the art that various changes in form and detail may be without departing from the spirit and scope of the present invention.

What is claimed is:

1. A current regulation system, generating a charging current curve for charging a rechargeable battery, the system coupled to a power converter and the rechargeable battery, receiving an input voltage of the power converter and outputting an output voltage to the rechargeable battery, the system comprising:

a current regulation module coupled to the power converter, outputting a conversion current in a constant current mode and a constant voltage mode;

a voltage-to-current regulation module coupled to the rechargeable battery, generating a voltage conversion current according to the output voltage and a first reference voltage in the constant voltage mode;

a temperature-to-current regulation module generating and outputting a temperature conversion current according to a temperature of the rechargeable battery in the constant current mode and the constant voltage mode; and a resistance coupled to the current regulation module, the voltage-to-current regulation module and the temperature-to-current regulation module, the resistance receiving the conversion current, the voltage conversion current and the temperature conversion current, wherein the resistance includes a resistance voltage and the resistance voltage includes a constant value; when the resistance regulates the voltage conversion current or the temperature conversion current in the constant current mode and the constant voltage mode, the constant value is maintained so the conversion current is gradually weakened; the charging current curve is regulated when the power of the rechargeable battery is full;

wherein when the rechargeable battery is charging in the constant current mode, all the conversion current flows through the resistance; when the output voltage reaches a first threshold value, the rechargeable battery is charging in the constant voltage mode so the voltage conversion current flows through the resistance and is gradually amplified and the conversion current is gradually weakened; when the amount of the conversion current flowing through the resistance reaches a second threshold value, the power of the rechargeable battery is full and the charging current curve is regulated.

2. The current regulation system according to claim 1, wherein the current regulation module includes a differential amplifier and a transistor, the differential amplifier outputting a control voltage according to the input voltage and the output voltage, the transistor controlling the conversion current generated by the power converter and flowing through the transistor.

3. The current regulation system according to claim 1, wherein the current regulation system is further coupled to a compensation circuit.

4. The current regulation system according to claim 3, further comprising an error amplifier coupled to the current regulation module, the voltage-to-current regulation module, the temperature-to-current regulation module, the resistance and the compensation circuit, the error amplifier including a second reference voltage, the error amplifier outputting an error voltage to the compensation circuit for compensation according to the second reference voltage and the resistance voltage.

5. The current regulation system according to claim 1, wherein when the rechargeable battery is charging in the constant current mode, all the conversion current flows through the resistance; the temperature-to-current module gradually amplifies the temperature conversion current according to the temperature so that the conversion current is gradually weakened.

6. The current regulation system according to claim 1, wherein the resistance includes a current-to-voltage converter.

7. The current regulation system according to claim 1, wherein the voltage-to-current regulation module is selected from the group of linear amplifier, voltage to current circuit and operational transconductance amplifier.

8. The current regulation system according to claim 1, wherein the temperature-to-current regulation module is selected from the group of proportional to absolute temperature circuit and complimentary to absolute temperature circuit; the temperature-to-current regulation module generates and outputs the temperature conversion current.

9. A current regulation system, generating a charging current curve for charging a rechargeable battery, the system coupled to a power converter and the rechargeable battery, receiving an input voltage of the power converter and outputting an output voltage to the rechargeable battery, the system comprising:

a current regulation module coupled to the power converter, outputting a conversion current in a constant current mode and a constant voltage mode;

a voltage-to-current regulation module coupled to the rechargeable battery, generating a voltage conversion current according to the output voltage and a first reference voltage in the constant voltage mode;

a temperature-to-current regulation module generating and outputting a temperature conversion current according to a temperature of the rechargeable battery in the constant current mode and the constant voltage mode;

a resistance coupled to the current regulation module, the voltage-to-current regulation module and the temperature-to-current regulation module, the resistance receiving the conversion current, the voltage conversion current and the temperature conversion current, wherein the resistance includes a resistance voltage and the resistance voltage includes a constant value; when the resistance regulates the voltage conversion current or the temperature conversion current in the constant current mode and the constant voltage mode, the constant value is maintained so the conversion current is gradually weakened; the charging current curve is regulated when the power of the rechargeable battery is full; and an error amplifier coupled to the current regulation module, the voltage-to-current regulation module, the temperature-to-current regulation module, the resistance and a compensation circuit, the error amplifier including a second reference voltage, the error amplifier outputting an error voltage to the compensation circuit for compensation according to the second reference voltage and the resistance voltage.

10. The current regulation system according to claim 9, wherein the current regulation module includes a differential amplifier and a transistor, the differential amplifier outputting a control voltage according to the input voltage and the output voltage, the transistor controlling the conversion current generated by the power converter and flowing through the transistor.

11. The current regulation system according to claim 9, wherein when the rechargeable battery is charging in the constant current mode, all the conversion current flows through the resistance; the temperature-to-current module gradually amplifies the temperature conversion current according to the temperature so that the conversion current is gradually weakened.

12. The current regulation system according to claim 9, wherein the resistance includes a current-to-voltage converter.

13. The current regulation system according to claim 9, wherein the voltage-to-current regulation module is selected from the group of linear amplifier, voltage to current circuit and operational transconductance amplifier.

14. The current regulation system according to claim 9, wherein the temperature-to-current regulation module is selected from the group of proportional to absolute temperature circuit and complimentary to absolute temperature circuit; the temperature-to-current regulation module generates and outputs the temperature conversion current.

15. A current regulation system, generating a charging current curve for charging a rechargeable battery, the system coupled to a power converter and the rechargeable battery, receiving an input voltage of the power converter and outputting an output voltage to the rechargeable battery, the system comprising:

a current regulation module coupled to the power converter, outputting a conversion current in a constant current mode and a constant voltage mode;

a voltage-to-current regulation module coupled to the rechargeable battery, generating a voltage conversion current according to the output voltage and a first reference voltage in the constant voltage mode;

a temperature-to-current regulation module generating and outputting a temperature conversion current according to a temperature of the rechargeable battery in the constant current mode and the constant voltage mode; and a resistance coupled to the current regulation module, the voltage-to-current regulation module and the temperature-to-current regulation module, the resistance receiving the conversion current, the voltage conversion current and the temperature conversion current, wherein the resistance includes a resistance voltage and the resistance voltage includes a constant value; when the resistance regulates the voltage conversion current or the temperature conversion current in the constant current mode and the constant voltage mode, the constant value is maintained so the conversion current is gradually weakened; the charging current curve is regulated when the power of the rechargeable battery is full;

wherein when the rechargeable battery is charging in the constant current mode, all the conversion current flows through the resistance; the temperature-to-current module gradually amplifies the temperature conversion current according to the temperature so that the conversion current is gradually weakened.

16. The current regulation system according to claim 15, wherein the current regulation module includes a differential amplifier and a transistor, the differential amplifier outputting a control voltage according to the input voltage and the output voltage, the transistor controlling the conversion current generated by the power converter and flowing through the transistor.

17. The current regulation system according to claim 15, wherein the resistance includes a current-to-voltage converter.

18. The current regulation system according to claim 15, wherein the voltage-to-current regulation module is selected from the group of linear amplifier, voltage to current circuit and operational transconductance amplifier.

19. The current regulation system according to claim 15, wherein the temperature-to-current regulation module is selected from the group of proportional to absolute temperature circuit and complimentary to absolute temperature circuit; the temperature-to-current regulation module generates and outputs the temperature conversion current.

* * * * *